United States Patent [19]
Jarvis

[11] Patent Number: 5,685,673
[45] Date of Patent: Nov. 11, 1997

[54] TWIST DRILL WITH REVERSE FLUTES

[76] Inventor: Wayne C. Jarvis, 1248 Reed Rd., Churchville, N.Y. 14428

[21] Appl. No.: 626,465

[22] Filed: Apr. 2, 1996

[51] Int. Cl.⁶ ........................................... B23B 51/02
[52] U.S. Cl. .......................... 408/230; 606/80; 606/180
[58] Field of Search ......................... 408/230, 227, 408/61, 56, 229; 606/80, 86, 167, 170, 180

[56] References Cited

U.S. PATENT DOCUMENTS

| | | |
|---|---|---|
| 3,049,018 | 8/1962 | Lusskin et al. |
| 3,577,808 | 5/1971 | Visser ............................ 408/61 |
| 4,111,208 | 9/1978 | Leuenberger ..................... 61/128 |
| 4,436,091 | 3/1984 | Banko .............................. 17/128 |
| 4,597,697 | 7/1986 | Shaffer ............................. 408/61 |
| 4,655,650 | 4/1987 | Crawford et al. ................. 77/408 |
| 5,065,647 | 11/1991 | Johnson ........................ 408/230 X |
| 5,078,554 | 1/1992 | Kubota ............................ 408/230 |
| 5,273,380 | 12/1993 | Musacchia ...................... 408/230 |
| 5,405,155 | 4/1995 | Kanaan et al. ................ 408/61 X |

*Primary Examiner*—Daniel W. Howell
*Assistant Examiner*—Henry W. H. Tsai
*Attorney, Agent, or Firm*—Bilicki & Simpson, P.C.

[57] ABSTRACT

A twist drill comprising a shank section at a top of the drill and a body section at a bottom of the drill, the body section having two or more flutes which spiral downwardly in a first direction and terminate proximate a point, the drill having cutting lips formed by the flutes and operatively arranged to cut material when the drill is rotated in a second direction opposite that of the orientation of the spiral flutes.

5 Claims, 4 Drawing Sheets

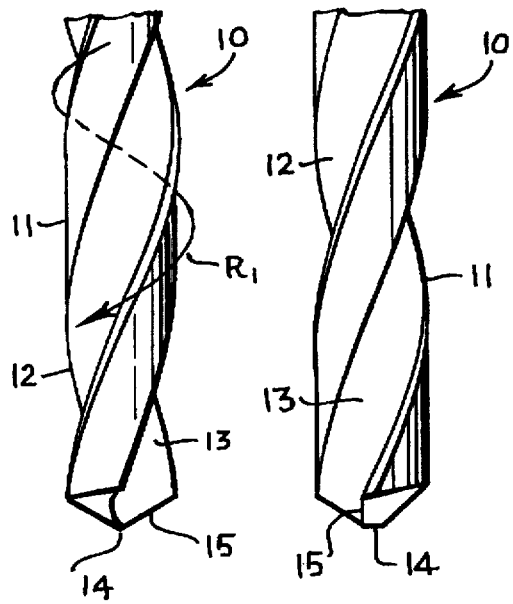
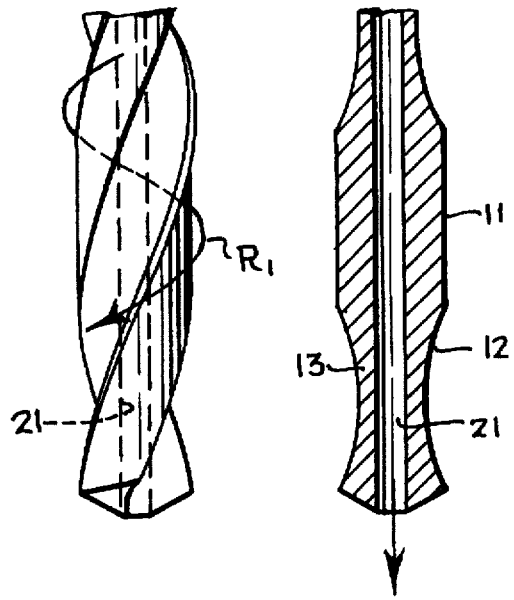
Fig. 1. Fig. 2. Fig. 4. Fig. 5.
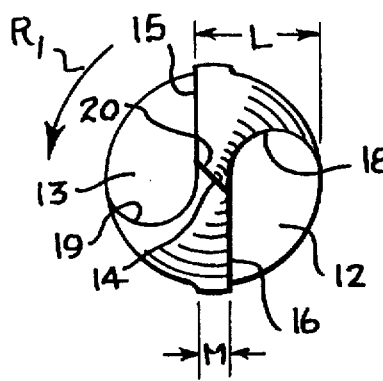
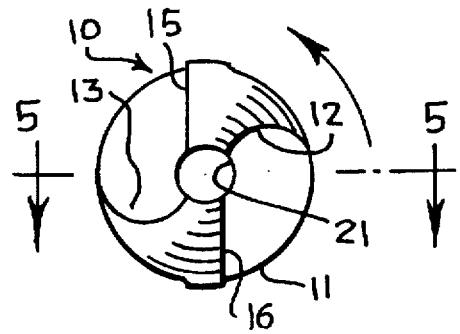
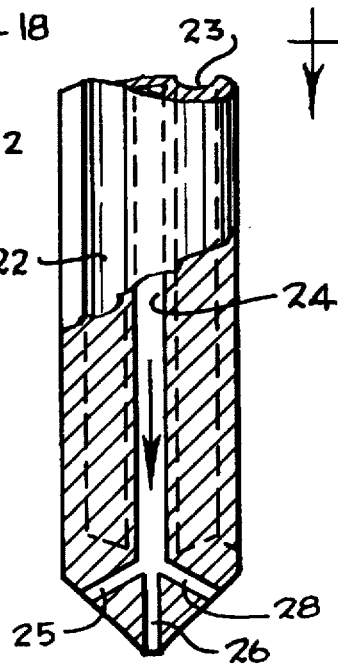
Fig. 3. Fig. 6.
Fig. 7.
ALL FIGS. PRIOR ART

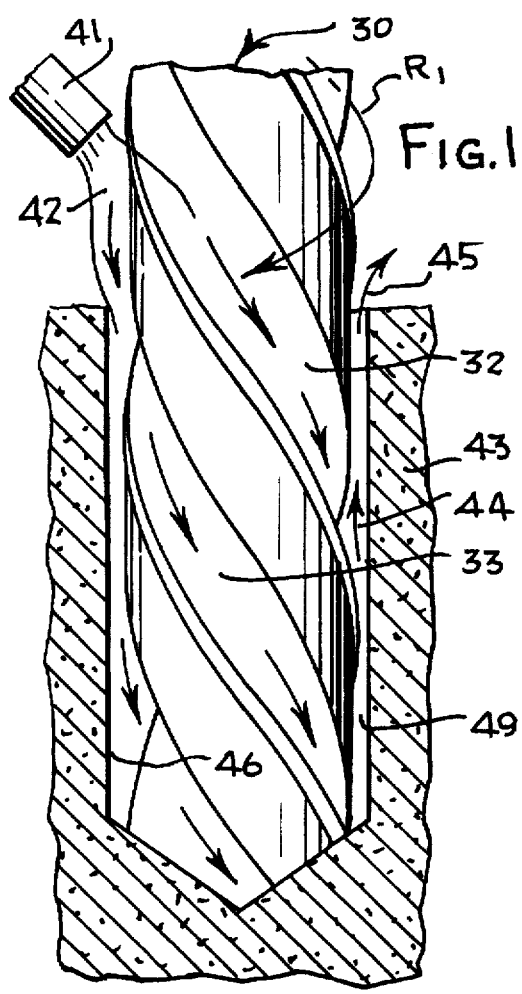
FIG. 12.
FIG. 13.
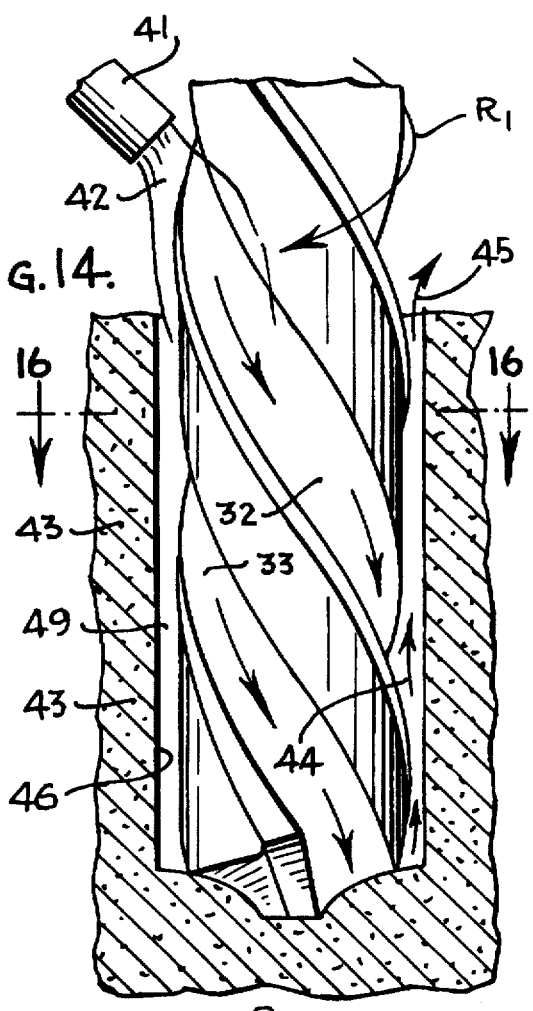
FIG. 14.
FIG. 15.
FIG. 16.

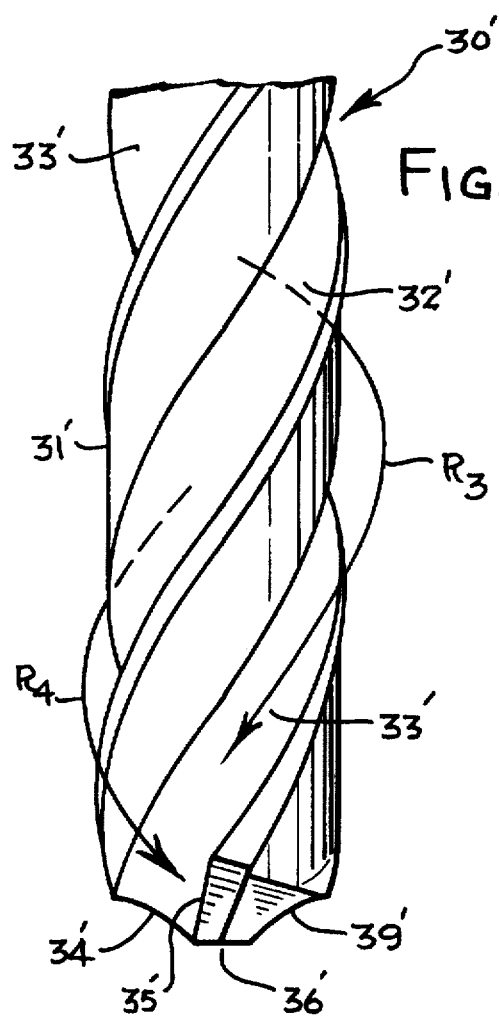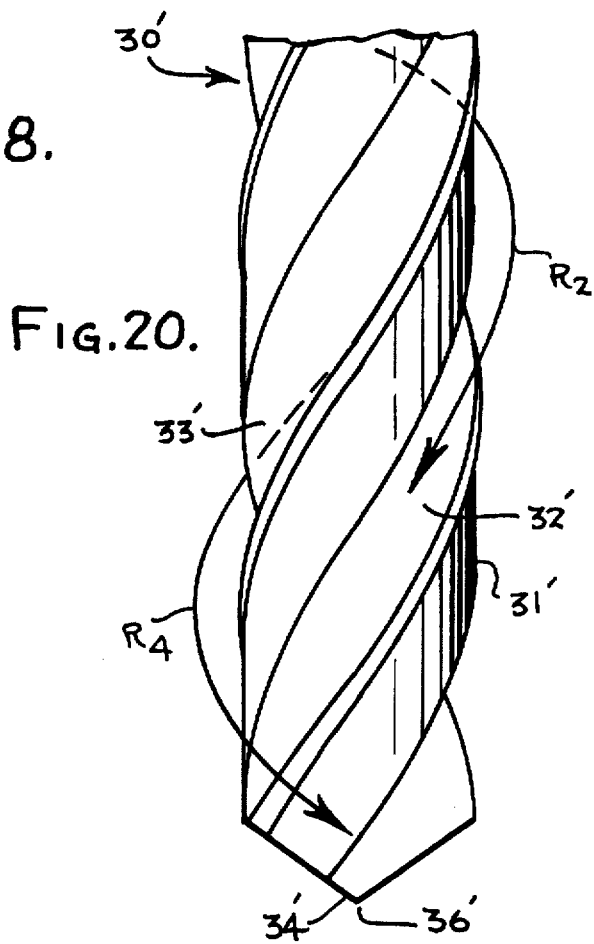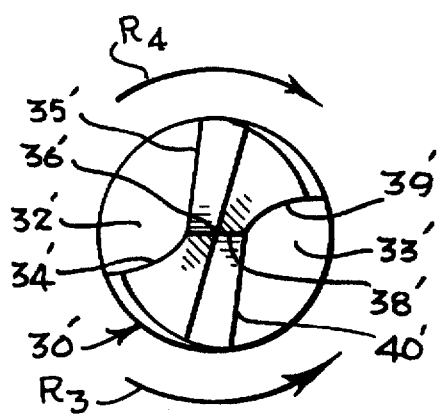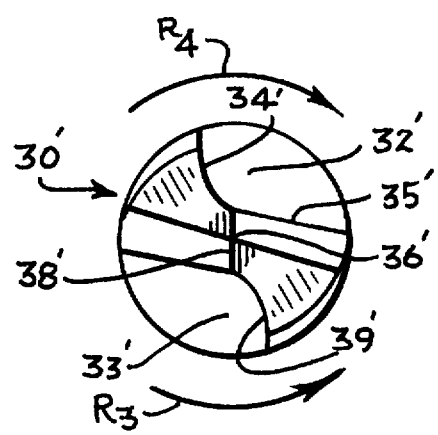

TWIST DRILL WITH REVERSE FLUTES

BACKGROUND OF THE INVENTION

The present invention relates generally to twist drills and, more specifically, to twist drills especially well suited for use in drilling bone during surgery, and even more especially during dentofacial surgery.

In dentofacial surgery, it is desired to cut and drill the bone of the patient as atraumatically as possible. The less trauma during drilling, the less will be the inflammatory response of the bone. Inflammatory response in the bone will often lead to soft tissue (rather than desired bone) at the healing interface of an implant, which renders the implant useless.

To minimize trauma, it is important to keep the cutting surface as cool as possible during drilling. To accomplish this, drills have been developed which deliver cooling water to the cutting surface. Although various types of drills are known and used in the art, a well-known design is a twist drill having conventional flutes and a longitudinal through-bore through which irrigating water is pumped.

There are several problems and disadvantages associated with drills having internal irrigation ports. The first disadvantage is the high cost of manufacturing a drill having a longitudinal through-bore.

A second disadvantage of prior art drills is that the water pressure in the internal irrigation ports is minimal and debris from the cutting edge of the drill tends to plug the ports since the fluid pressure of the irrigant is not enough to keep the ports free from debris.

Even if the ports are kept free from debris, studies have shown that the hydrostatic pressure from fluids in the hole cut in the bone are generally greater than the pump pressure from the irrigation. Thus, even if the ports are not plugged, the irrigant may not be effectively being pumped to the cutting edge of the drill.

Another major drawback of internally irrigated drills is that, due to the high cost of manufacturing them, they are designed for multiple usages. As the drill is repeatedly used, its cutting edges tend to dull which reduces its cutting efficiency and eventually causes overheating during drilling. Another problem with multiple usages is that the internal ports must be cleaned and sterilized after each use, which is very difficult to do effectively because of the small size of the opening. There is a distinct possibility of a contaminated drill being re-used on a different patient with the possibility of disease transmission.

It is apparent that a long-felt need has existed for a new drill which can be manufactured inexpensively such that it is disposable, ensuring that the drill sharpness is the same for each surgical use, and also eliminating the problems of cleaning and sterilizing the drill and minimizing the risk of disease transmission from patient to patient. A need has also existed for a drill which is capable of providing cooling water to the cutting surface without the need to pump the water through an internal through-bore.

BRIEF SUMMARY OF THE INVENTION

The present invention is a twist drill comprising a shank section at a top of the drill and a body section at a bottom of the drill, the body section having two or more flutes which spiral downwardly in a first direction and terminate proximate a point, the drill comprising cutting lips formed by the flutes and operatively arranged to cut material when the drill is rotated in a second direction opposite that of the orientation of the spiral flutes.

Accordingly, the general object of the invention is to provide a drill which provides efficient irrigation to its cutting surface without the use of an internal through-bore.

Another object of the invention is to provide a twist drill with reverse flutes which can be manufactured inexpensively.

A further object is to provide a drill which is disposable so as to prevent the transmission of disease from patient to patient.

These and further objects and advantages are achieved by the present invention as illustrated in the attached drawings and described in the specification and appended claims.

BRIEF DESCRIPTION OF THE DRAWINGS

FIG. 1 is a sectional vertical elevation of a prior art, conventional "right-hand" twist drill;

FIG. 2 illustrates the twist drill of FIG. 1 rotated 90°;

FIG. 3 is a bottom view of the twist drill of FIG. 2;

FIG. 4 is a sectional vertical elevation of a prior art, conventional "right-hand" twist drill having a longitudinal irrigation throughbore therein;

FIG. 5 is a sectional vertical cross-sectional view of the twist drill of FIG. 4 rotated 90°, and taken generally along line 5—5 of FIG. 6;

FIG. 6 is a bottom view of the twist drill of FIG. 5;

FIG. 7 is a sectional partial cross-sectional view of a prior art, vertical flute pilot drill having irrigation ports therein;

FIG. 12 is a sectional vertical elevation of the drill of the present invention shown cutting into bone;

FIG. 13 is a bottom view of the drill shown in FIG. 12;

FIG. 14 illustrates the drill of FIG. 12 rotated 90°;

FIG. 15 is a bottom view of the drill shown in FIG. 14;

FIG. 16 is a cross-sectional view of the drill shown in FIG. 12, taken generally along line 16—16 of FIG. 12;

FIG. 18 is a view of an alternative embodiment of the invention;

FIG. 19 is a bottom view of the drill shown in FIG. 18;

FIG. 20 is a view of the drill shown in FIG. 18 except rotated by 90°;

FIG. 21 is a bottom view of the drill shown in FIG. 20.

DETAILED DESCRIPTION OF THE INVENTION

Figure 8:
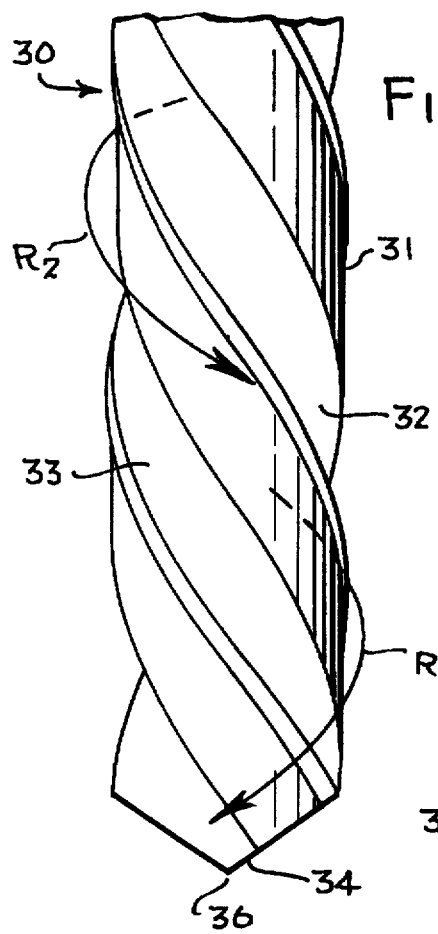
FIG. 8 is a sectional, vertical elevation of the twist drill of the invention.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read together with the specification, and are to be considered a portion of the entire "written description" of this invention, as required by 35 U.S.C. 112. As used in the following description, the terms "vertical", "top" and "bottom" as well as adjectival and adverbial derivatives thereof refer to the orientation of the illustrated structure as the particular drawing figure faces the reader. The terms "clockwise" and "counterclockwise" as used to describe directions of rotation are referenced from the perspective of one facing the tip or point of the drill.

THE PRIOR ART

FIG. 1 illustrates in sectional vertical elevation a conventional prior art "right-hand" twist drill 10. FIG. 1 illustrates only the body 11 of the twist drill, and not the shank, which is located at the top of the drill above the body. Body 11 of twist drill 10 comprises two helical flutes 12 and 13, respectively, which spiral downwardly in a counterclockwise rotation as viewed from a perspective facing the bottom of the drill. At the bottom of the drill is point 14. Flute 13 forms straight cutting lip 15 which functions to cut material when the drill is rotated in a counterclockwise direction from the perspective of one facing the point of the drill. The direction of rotation is indicated by arrow $R_1$ in FIG. 1. Thus, it is seen that, in a conventional drill, the flutes spiral in the same rotational direction as that used for drilling. The drill is termed a "right-hand" drill because if one was to wrap the right hand around the drill bit with the thumb pointing in the direction of the hole to be drilled, the fingers would wrap about the drill in the required direction of rotation.

FIG. 2 illustrates the drill of FIG. 1 rotated counterclockwise 90°. With a conventional drill bit as illustrated in FIGS. 1 and 2, as the drill rotates, cut material naturally flows upwardly through the flutes and out of the bore. As the material is cut, the friction between the cutting lips and the material being drilled creates heat. In the case of bone, this heat creates unwanted trauma.

FIG. 3 is a bottom view of the drill bit shown in FIG. 2, and illustrates some of the common features of conventional drill bits, including flutes 12 and 13, point 14, cutting lips 15 and 16, trailing arcuate lips 18 and 19, chisel edge 20, margin M, and land L.

To solve the heating problem, drills have been designed with longitudinal bores through which cooling water is pumped. A drill of this type is illustrated in FIG. 4, which drill is identical in all respects to the drill of FIG. 1, except for through-bore 21, through which cooling water is pumped. The drill of FIG. 4 is shown in longitudinal cross-section in FIG. 5 to better illustrate through-bore 21. FIG. 6 is a bottom view of the drill of FIG. 5 and illustrates that the through-bore is located at the center of the drill, and is intended to supply cooling water to the cutting lips 15 and 16.

FIG. 7 illustrates yet another prior art embodiment, that of a vertical flute pilot drill. This drill has vertical flutes 22 and 23, and longitudinal irrigation bore 24 which then feeds secondary irrigation bores 25, 26 and 28, respectively. This particular drill is extremely expensive to manufacture.

THE PREFERRED EMBODIMENT

Figure 17:
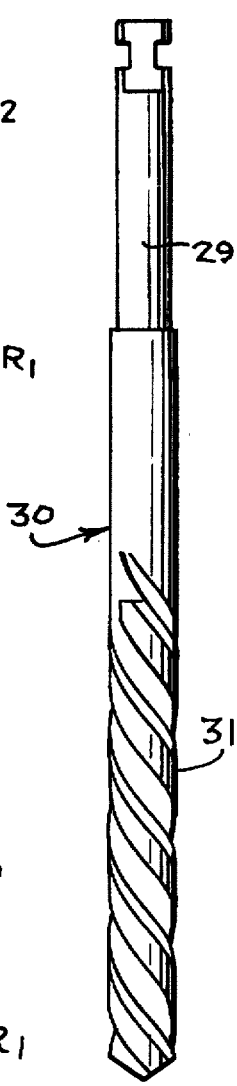
FIG. 17 is a vertical elevation of the twist drill of the invention.

FIG. 17 illustrates the reverse twist drill 30 of the invention, which comprises shank section 29 and body section 31. The drill is described as a "reverse twist drill" because the orientation of the flutes is reversed with respect to conventional prior art drills. Body section 31, shown enlarged in FIG. 8, contains spiral flutes 32 and 33, which spiral downwardly in clockwise direction $R_2$ as viewed from the perspective of one facing drill point 36. Flute 32 terminates proximate point 36 in cutting lip 34, which, as shown in bottom view in FIG. 9, is an arcuate surface which has been sharpened for cutting. This arcuate cutting lip is a unique feature of the drill, since cutting lips on conventional drills are usually straight.

Figure 9:
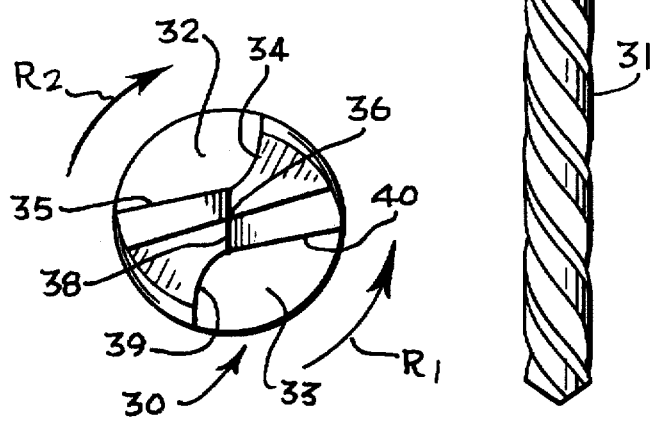
FIG. 9 is a bottom view of the drill shown in FIG. 8.

As mentioned above, flutes 32 and 33 spiral downwardly in first direction $R_2$ as shown in FIG. 8. However, the drill only cuts when rotated in second direction $R_1$, which is opposite that of $R_2$. For example, $R_1$ may be counterclockwise and $R_2$ may be clockwise.

FIG. 9 is a bottom view of the drill shown in FIG. 8, and clearly shows flute 32 with its arcuate cutting lip 34, and flute 33 with its arcuate cutting lip 39. Flute 32 also comprises straight non-cutting lip 35, and flute 33 also comprises straight non-cutting lip 40. The figure also illustrates drill point 36, and chisel edge 38 which extends from the intersection of cutting lip 34 and non-cutting lip 35, through point 36 to the intersection of cutting lip 39 and non-cutting lip 40. Finally, the figure illustrates the clockwise spiral rotation $R_2$ of the flutes and the counterclockwise cutting rotation $R_1$ of the drill.

Figure 10:
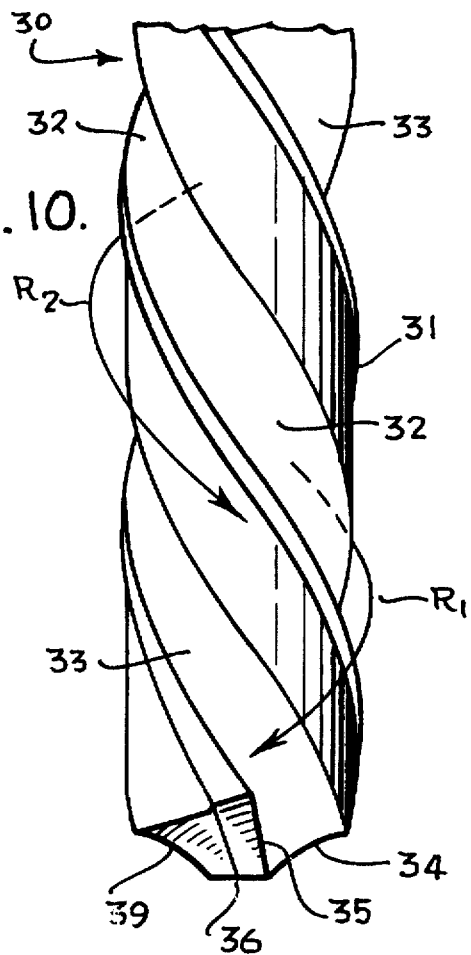
FIG. 10 is a view of the drill of FIG. 8 except rotated 90°.
Figure 11:
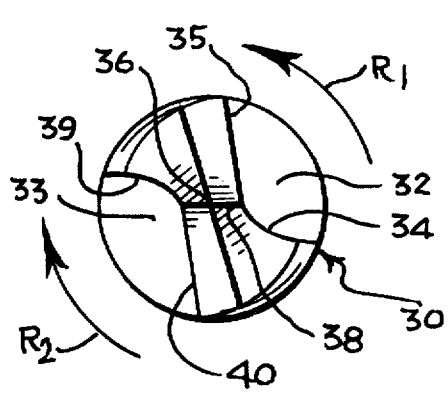
FIG. 11 is a bottom view of the drill shown in FIG. 10.

FIG. 10 is a view similar to FIG. 8 except the drill has been rotated clockwise 90°, and FIG. 11 is the corresponding bottom view of the drill shown in FIG. 10.

The reverse twist drill is shown in operation in FIG. 12 drilling through bone 43. FIG. 12 shows drill 30 in exactly the same orientation as in FIG. 8. The drawing also shows means 41 for providing cooling or lubricating fluid 42 to an exterior surface of the drill during drilling. The cooling means may be any suitable pump common in the art. The pump is adjustable and may be directed to any point on the surface of the drill bit. The cooling fluid 42, which may be water, is directed to the flutes which carry the fluid down to the cutting surface (i.e., to the cutting lips.) It is the unique reverse twist of the drill, in a direction opposite that of drill rotation ($R_1$), which causes the cooling water to naturally flow downwardly toward the cutting surface. In fact, inside the bore, the drill actually functions like a turbine as it forces the water downward. The direction arrows shown in flutes 32 and 33 indicate the direction of cooling water flow. Water escapes the bore in the small space between the bore wall 46 and the drill in the direction indicated by arrows 44 and 45.

The cooling water flow is also shown in FIG. 13, which is a bottom view of the drill of FIG. 12. The negative sign ("−") indicates a direction toward the drill point, whereas a positive sign ("+") indicates fluid flow away from the point. Arrows 47 and 48 indicate the direction of flow from flutes 32 and 33, respectively, into the space 49 between the drill and the wall 46 of the bore.

FIG. 14 is a view similar to that of FIG. 12, except with the drill rotated by 90°. FIG. 15 is a bottom view of the drill shown in FIG. 14.

FIG. 16 is a cross-sectional view taken generally along line 16—16 of FIG. 14. Again, the negative sign ("−") indicates fluid flow in a downwardly direction, and the positive sign ("+") indicates fluid flow in an upwardly direction.

FIG. 18 illustrates an alternative embodiment of the invention designed for clockwise rotation during cutting. In the embodiment shown, all similar features and elements are illustrated with the same reference numbers as in the previous figures, except that "prime" notation has been added to signify the alternative embodiment. The drill illustrated in FIGS. 18–21 is a so-called "left-hand" drill because if one wraps the left hand about the drill with the thumb pointing downward toward the point, the fingers wrap in the direction of rotation required for cutting.

Body section 31', shown enlarged in FIG. 18, contains spiral flutes 32' and 33', which spiral downwardly in counterclockwise direction $R_3$ as viewed from the perspective of one facing drill point 36'. Flute 32' terminates in cutting lip 34', which, as shown in bottom view in FIG. 19, is an arcuate surface which has been sharpened for cutting. This arcuate cutting lip is a unique feature of the drill, since cutting lips on conventional drills are usually straight.

As mentioned above, flutes 32' and 33' spiral downwardly in first direction $R_3$ as shown in FIG. 18. However, the drill only cuts when rotated in second direction $R_4$, which is opposite that of $R_3$. For example, $R_3$ may be counterclockwise and $R_4$ may be clockwise.

FIG. 19 is a bottom view of the drill shown in FIG. 18, and clearly shows flute 32' with its arcuate cutting lip 34', and flute 33' with its arcuate cutting lip 39'. Flute 32' also comprises straight non-cutting lip 35', and flute 33' also comprises straight non-cutting lip 40'. The figure also illustrates drill point 36', and chisel edge 38' which extends from the intersection of cutting lip 34' and non-cutting lip 35', through point 36' to the intersection of cutting lip 39' and non-cutting lip 40'. Finally, the figure illustrates the counterclockwise spiral rotation $R_3$ of the flutes and the clockwise cutting rotation $R_4$ of the drill.

FIG. 20 is a view similar to FIG. 18 except the drill has been rotated clockwise 90°, and FIG. 21 is the corresponding bottom view of the drill shown in FIG. 20.

It will be appreciated that various modifications to the inventive concepts may be apparent to those skilled in the art without departing from the spirit and scope of the invention. For example, a preferred embodiment drill bit containing only two spiral flutes has been described and illustrated, but it is to be understood that the present invention is not intended to be limited to a drill having only two flutes.

What is claimed is:

1. A twist drill comprising a shank section at a top of the drill and a body section at a bottom of the drill, said body section having two or more flutes which spiral downwardly in a first direction and terminate proximate a point, said drill having cutting lips formed by said flutes and operatively arranged to cut material when said drill is rotated in a second direction opposite that of the orientation of said flutes.

2. A twist drill as recited in claim 1 wherein said first direction is clockwise as viewed from the point of the drill, and said second direction is counterclockwise as viewed from the point of the drill.

3. A twist drill as recited in claim 1 wherein said first direction is counterclockwise as viewed from the point of the drill, and said second direction is clockwise as viewed from the point of the drill.

4. A twist drill as recited in claim 1 and further comprising means for providing cooling or lubricating fluid to an exterior surface of said drill during drilling, wherein said fluid flows downwardly through said flutes to the cutting lips.

5. A twist drill as recited in claim 1 wherein said cutting lips are arcuate.

* * * * *